(12) United States Patent  
Li et al.

(10) Patent No.: US 9,167,743 B2
(45) Date of Patent: Oct. 27, 2015

(54) GREENING ROLL

(76) Inventors: Shaocai Li, Chengdu (CN); Hailong Sun, Chengdu (CN); Feng Long, Chengdu (CN); Fubin Li, Chengdu (CN)

( * ) Notice: Subject to any disclaimer, the term of this patent is extended or adjusted under 35 U.S.C. 154(b) by 49 days.

(21) Appl. No.: 13/879,612

(22) PCT Filed: Feb. 22, 2012

(86) PCT No.: PCT/CN2012/071464
§ 371 (c)(1),
(2), (4) Date: Apr. 15, 2013

(87) PCT Pub. No.: WO2013/123653
PCT Pub. Date: Aug. 29, 2013

(65) Prior Publication Data
US 2014/0059926 A1    Mar. 6, 2014

(51) Int. Cl.
*A01G 9/02* (2006.01)
*A01C 1/04* (2006.01)
*A01G 1/00* (2006.01)
*A01G 7/00* (2006.01)
*A01G 29/00* (2006.01)

(52) U.S. Cl.
CPC ............. *A01C 1/044* (2013.01); *A01G 1/005* (2013.01); *A01G 7/00* (2013.01); *A01G 29/00* (2013.01)

(58) Field of Classification Search
CPC .................................................. A01G 1/007
USPC ........................................................ 47/65.9
See application file for complete search history.

(56) References Cited

U.S. PATENT DOCUMENTS 5,226,255 A    7/1993  Robertson ..................... 47/56
5,287,650 A    2/1994  Moriguchi et al. ........... 47/59

(Continued)

FOREIGN PATENT DOCUMENTS

CN         2590362 Y    12/2003
CN      201048485 Y     4/2008

(Continued)

OTHER PUBLICATIONS

International Search Report of international application No. PCT/CN2011/071464, dated Dec. 6, 2012.

*Primary Examiner* — Kristen C Hayes
(74) *Attorney, Agent, or Firm* — J.C. Patents

(57) ABSTRACT

A greening roll includes water-temperature-light controlling part, root growing part, water/root regulating part and seed-stacking part which is located in the water-temperature-light controlling part. The water-temperature-light controlling part is located on the top surface of the greening roll, the water/root regulating part is located on the lower surface of the greening roll, the root growing part is located in the cavity composed by the water-temperature-light controlling part and the water/root regulating part, and the seed-stacking part is located in the cavity of the water-temperature-light controlling part. The water-temperature-light controlling part further includes top-located irradiation reflecting part, temperature-water regulating part, light-preventing part and seed-stacking cavity. The present invention is suitable for the engineering protection and greening of engineering slopes, spoil and slag yards, embankments and the like, the water and soil conservation and greening of sandy lands, abandoned lands, borrow pits, slurry pond, mining fields, industrial and mining abandoned lands and the like, and the engineering thermal insulation and greening of building roofs and the like.

16 Claims, 3 Drawing Sheets

(56) References Cited

U.S. PATENT DOCUMENTS

| | | | |
|---|---|---|---|
| 5,390,442 A | 2/1995 | Behrens | 47/59 |
| 5,421,123 A | 6/1995 | Sakate et al. | 47/56 |
| 6,694,672 B1 * | 2/2004 | Hergeth | 47/65.9 |
| 7,845,113 B2 * | 12/2010 | Casimaty et al. | 47/65.9 |
| 7,958,669 B2 * | 6/2011 | Casimaty et al. | 47/1.01 F |
| 8,209,905 B2 * | 7/2012 | Furumura et al. | 47/65.9 |
| 8,701,345 B2 * | 4/2014 | Furumura et al. | 47/65.9 |
| 2009/0178334 A1 | 7/2009 | Henderson | 47/56 |
| 2009/0265983 A1 * | 10/2009 | Matsui | 47/65.9 |

FOREIGN PATENT DOCUMENTS

| | | |
|---|---|---|
| CN | 101982034 A | 3/2011 |
| DE | 38 05 069 A1 | 9/1989 |
| GB | 2 003 013 A | 3/1979 |
| JP | 2000-308416 A | 11/2000 |
| JP | 2005-198532 A | 7/2005 |

* cited by examiner

GREENING ROLL

TECHNICAL FIELD

The present invention relates to a novel greening roll, particularly a greening roll structure and configuration based on a water-plant-temperature coupling. The present invention is suitable for the engineering protection and greening of engineering slopes, spoil and slag yards, embankments and the like, the water and soil conservation and greening of sandy lands, abandoned lands, borrow pits, slurry pond, mining fields, industrial and mining abandoned lands and the like, and the engineering thermal insulation and greening of building roofs, underground engineering top slabs and the like.

BACKGROUND ART

While bringing mankind abundant material wealth, the development of the world also leads to the global ecological environment deterioration and causes a series of ecological problems, for example, the serious damage to vegetation such as forests and grasslands, water and soil loss, soil desertification aggravation, etc., which pose a grave threat to human survival and development. With the developing concept of the ecological environment and the increasing sustainable development requirements, the ecological management with plants as a main component has become an important technical approach to control the water and soil loss domestically and overseas. However, the restoration of ecosystems, such as exposed geotechnical surface and desertification or stony desertification land, is limited by the soilless or poor soil conditions, so that vegetation conditions need to be artificially provided. The main characteristic of the present vegetation restoration products is to combine plant seeds with functional carriers, so as to form roll products easy to plant artificially; the advantages lie in that the construction speed is fast and not limited by soil conditions. Whereas both the domestic and foreign relevant products have the common shortcomings such as single herb species added, low composite strength, poor structural stability, etc.

U.S. Pat. No. 5,226,255 discloses a vegetation blanket, the upper and lower parts of which are made of naturally degradable non-woven fibers. The middle layer that links the non-woven fiber layer is an apertured plastic mesh with high strength and two-way stability. The vegetation blanket includes seeds and may also include fertilizer and/or water absorbing material. This vegetation blanket can be laid on bare hillsides and reduce the soil erosion caused by runoffs.

U.S. Pat. No. 5,421,123 discloses a vegetation blanket that has a netty system and can prevent the loss of plant material. The vegetation blanket consists of soil improvement material, fertilizer, organic material and seeds, and forms a whole by bonding the upper and lower ribbons. The hole-like mesh can meet the requirements of plants germination and growth.

U.S. Patent no. 20090178334 discloses a vegetation blanket. The upper layer is made of fiber mesh with open grids to achieve a water penetration effect. The fibers extend to the grids so as to make seeds adhere to the fibers and stay in the grids. The lower layer is easy to absorb water and is composed of absorbent paper towel or spinning. The two layers of the vegetation blanket are both degradable materials.

Chinese patent CN201048485 slope greening vegetation blanket discloses a vegetation blanket. Evenly laid dry plant substrate is located between the upper layer mesh and the lower layer mesh made of jute or plastic. An integral blanket roll is formed by connecting upper and lower layers using stitch-bonding thread. There is also a layer of non-woven fabrics or degradable paper seed embryo between the lower layer mesh and the dry plant substrate, with evenly laid plant seeds adhered to the seed embryo.

At present, both the domestic and foreign ecological vegetation blankets have a certain role in water and soil conservation, with the advantages of simple manufacturing process, low maintenance, low cost, etc. However, there are also some deficiencies:

Firstly, with a small amount of substrate added, they can not be directly applied to vegetation restoration or greening of soilless interfaces. When they're used for vegetation restoration of rock slopes, slag fields, sandy lands, roofs, etc., the engineering surfaces must be covered with soil or artificial substrate before laying the vegetation restoration materials, therefore the construction cost is high.

Secondly, the solution to the control of water and temperature is simply covering with fiber, or filling with great amount of water retaining agent with seeds directly sprinkled into the water retaining agent. This will cause poor vegetation growth and can not achieve a good function of temperature and water control. Vegetation degradations tend to appear in case of extreme weather conditions, which will increase the engineering maintenance cost.

Thirdly, due to the above-described drawbacks, there are certain requirements for the environmental conditions of the vegetation blanket application, thus the application is limited to a small scope.

SUMMARY OF THE INVENTION

The object of the present invention is to provide a new type of greening roll, which can inhibit the water evaporation effectively, has a good temperature control function, is good for fast seeds germination and seedling growth, and can improve the germination rate of seeds and the survival rate of seedlings. Thereby the said greening roll can be directly applied in soilless interfaces with simple construction and low planting cost.

The present invention provides a greening roll which includes water-temperature-light controlling part, root growing part, water/root regulating part and seed-stacking part inside the water-temperature-light controlling part. The water-temperature-light controlling part is located on the upper surface of the greening roll and the water/root regulating part is located on the lower surface of the greening roll. The root growing part is located in the cavity formed by the water-temperature-light controlling part and the water/root regulating part, and the seed-stacking part is in the cavity inside the water/root regulating part. The said water-temperature-light controlling part includes top-located irradiation reflecting part, temperature-water regulating part, light-preventing part and seed-stacking cavity.

The water-temperature-light controlling part has the functions of reflecting irradiation, regulating temperature, controlling water, preventing light, etc. In other words, under intense irradiation conditions, it reflects irradiation, reduces absorption of heat and takes effect of thermal insulation and cooling; in low temperature environment, it reduces the loss of internal heat, achieves effects of thermal insulation and heat preservation and keeps the ambient temperature of the rhizosphere to be suitable and stable, while reducing the water evaporation in the lower layer; it prevents light from penetrating the root growing layer and protects the root from photosynthetic induction. The root growing part is used for balancing the water and nutrients supplied to plants, which ensures the stability of planting in soilless interfaces. The water/root regulating part is used for regulating the water capacity so as to ensure the water penetration to the lower interface occurs only after the water absorption in root growing layer is saturated.

DETAILED DESCRIPTION OF THE EMBODIMENTS

In use, the greening roll of the present invention, fixed by anchorage members, can directly cover the engineering restoration or greening exposed surfaces of engineering slopes, spoil and slag yards, embankments, sandy lands, abandoned lands, borrow pits, tailing area, mining fields, industrial and mining abandoned lands, building roofs, underground engineering top slabs and so on, requiring only watering management. It is necessary to point out that the orientations "up" and "down" described herein are positioned by stem and leaf upward and root downward during plant growth.

Embodiments

The greening roll of the present invention includes the water-temperature-light controlling part 100, the root growing part 5, the water/root regulating part 6 and the seed-stacking part located in the water-temperature-light controlling part.

Figure 1:
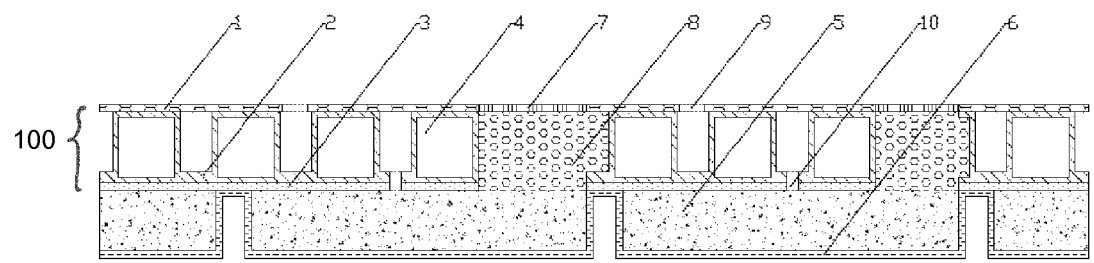
FIG. 1 is a structure diagram of the greening roll.

Referring to FIG. 1, the water-temperature-light controlling part 100 includes the irradiation reflecting part 1, the temperature-water regulating part 2, the light-preventing part 3 and the seed-stacking cavity. The temperature-water regulating part 2 further includes sealed chamber thermal insulating cavities 4.

The water-temperature-light controlling part has three functions: irradiation reflection, temperature and water regulation and light prevention. Through sewing, glue bonding, thermal bonding and the like, the irradiation reflecting part 1, the temperature-water regulating part 2 and the light-preventing part 3 are combined together to form the water-temperature-light controlling part 100. The first water infiltration holes 9 are set in the irradiation reflecting part 1 and the second water infiltration holes 10 are set in the light-preventing part 3. The first water infiltration holes 9 and the second water infiltration holes 10 are connected through gaps between the sealed chamber thermal insulating cavities 4 in the temperature-water regulating part 2.

The three functions of the water-temperature-light controlling layer part—irradiation reflection, temperature-water regulation and light prevention—specifically refer to: In intense irradiation weather such as summer, it reflects the irradiation, reduces the absorption of heat and takes the effect of thermal insulation and cooling; in cold weather such as winter, it reduces the loss of internal heat in order to achieve the effect of thermal insulation and heat preservation, while reducing the water evaporation in the lower layer; and it prevents light from penetrating the root growing layer and protects the root from photosynthetic induction.

The root growing part 5 consists of growth substrate particles which are made by overpressure compression, water absorbent materials with degradable film coating and fertilizer. The root growing part 5 is used to balance the water and the nutrients supplied to plants and ensure the stability of planting in soilless interfaces.

Figure 5:
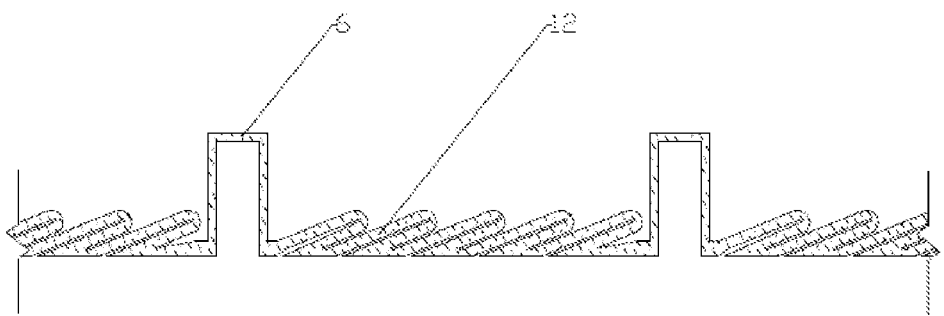
FIG. 5 is a space structure diagram of the water capacity.

The water/root regulating layer part 6 is used to regulate the water capacity space. The water/root regulating layer part 6 is made of overpressure permeable material or perforated material and has the adjustable water capacity space 12 arranged at a certain spacing. The water capacity space 12 is made by folding the material after stretching and may open under the water swelling stress of the root growing part to form holding chambers, which accommodates the root growing material and water. It ensures that the water penetration to the lower interface occurs only after the water absorption in the root growing part 5 is saturated, as well as improves the stability of the root growing part 5 and induces the root to grow fast, as shown in FIG. 5.

Figure 2:
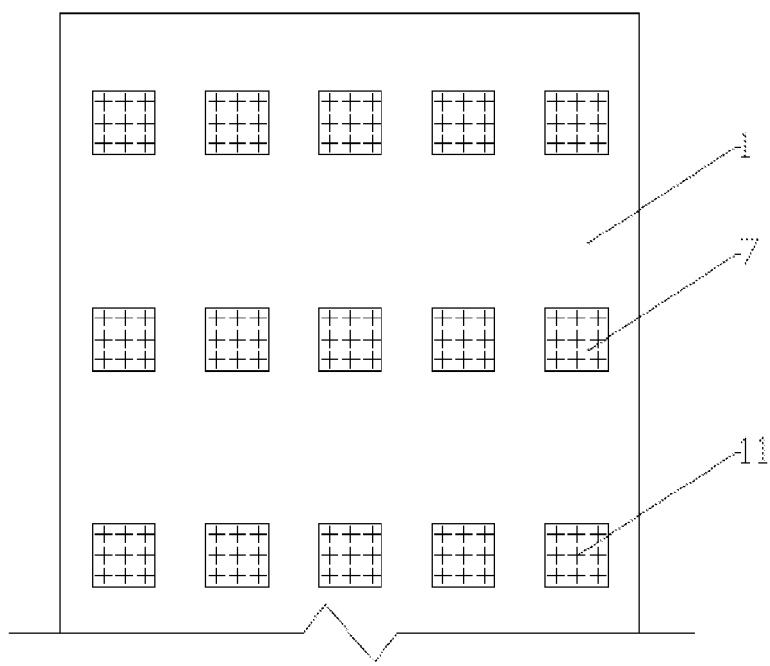
FIG. 2 is a top view of the greening roll.
Figure 3:
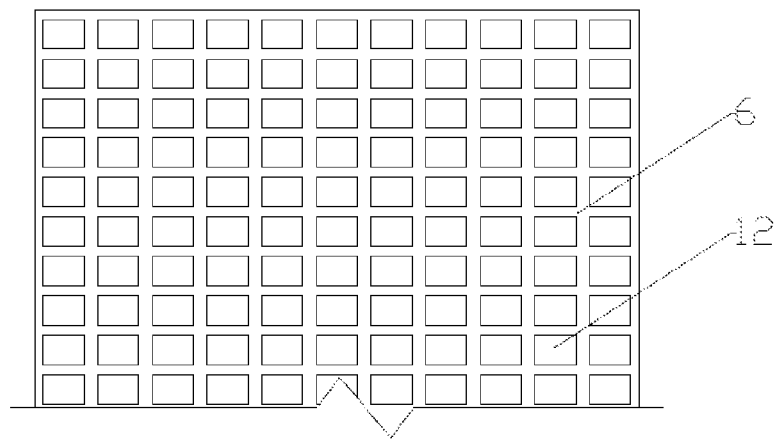
FIG. 3 is a water capacity space arrangement drawing of the water/root regulating part of the greening roll.
Figure 4:
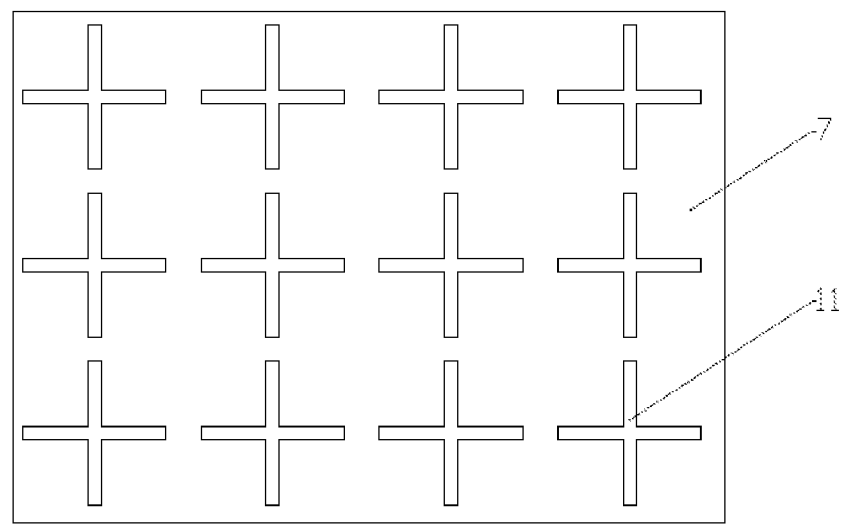
FIG. 4 is a structure diagram of the seed germination belt.

Referring to FIG. 1 and FIG. 2, the seed-stacking part is located in the seed-stacking cavity of the water-temperature-light controlling part. The seed-stacking part includes seed mixture 8 and seed germination belt 7 covering the upper surface of the seed mixture 8, wherein the seed germination belt 7 has seed germination holes 11.

The seed germination holes 11 are in shrinkage closed state before the seed mixture absorbs water, which can completely cover the seed mixture when the seeds have not germinated, so as to reduce the water evaporation. The seed germination holes 11 may be one or more of a cruciform slit, a ✶-shaped slit, a ⊏-shaped slit, a E-shaped slit, a T-shaped slit, a X-shaped slit, a V-shaped slit, a ⌒-shaped slit, a circular hole and a square hole arranged at a certain spacing and in a certain manner. The size of the openings is 5 mm~20 mm.

Preferably, the irradiation reflection ability of the water-temperature-light controlling part is greater than or equal to 75%, and the heat conduction coefficient is less than or equal to 0.03 W/(m·K), and the light-preventing rate to visible light is greater than or equal to 95%. The water absorbing ability of the root growing layer 5 is 10~15 kg/m$^2$, and the half-life of the water absorbing function is more than 5 years, and the effective dose of the nutrients content is greater than or equal to 150 g/m$^2$ and the controlled-release period of the material nutrients capsule is greater than 5 years. The expandable height of the water capacity space 12 is 30~50 mm.

In Use, water enters into the greening roll through the first water infiltration holes 9 in the irradiation reflecting part 1 of the water-temperature-light controlling part, flows down via the clearances in the temperature-water regulating part 2, and then enters into the root growing part 5 through the second water infiltration holes 10 in the light blocking part 3. In addition, water enters into the seed mixture 8 via the seed germination holes 11 in the seed germination belt 7, thus can be absorbed and stored by plant seeds or roots and supplied to the plant germination and growth.

More specifically, the material, composition and manufacturing of each layer are as follows. The size and structure are exemplary and are not the only. Various modifications and adaptations can be made by those skilled in the art according to specific embodiments without departing from the spirit and scope of the present invention.

The thickness of the water-temperature-light controlling part is 5 mm~20 mm. The water-temperature-light controlling part is molded through the composite process of the irradiation reflecting part 1, the temperature-water regulating part 2 and the light-preventing part 3. Wherein the irradiation reflecting part 1, with a thickness of less than or equal to 0.1 mm, can be made of non-woven material, textile material, degradable plastic film material or the like. The reflection irradiation effect is achieved by adding functional material to raw material or by treating the surface properties of the material, and the effective time of the material function is more than 5 years. The temperature-water regulating part 2, with a thickness of 5 mm~20 mm, is formed by sealed chamber thermal insulating cavities 4, which are made of the degradable film through stretching and foaming, and the effective time of the material function is 3~5 years. The light-preventing part 3, with a thickness of less than or equal to 0.1 mm, can be made of black or opaque flexible impermeable or permeable material, such as black polyethylene film, black non-woven fabrics and black textile cloth, where the impermeable material is preferred, and the effective time of the material function is 3~5 years.

The root growing part 5 consists of the mixture of plant growth substrate, water absorbent material, fertilizer, etc. The thickness of the root growing part 5 is 2 mm~10 mm. The root growing part 5 is located in the cavity formed by the water-temperature-light controlling part and the water/root regulating part. The growth substrate is compressed into particles by overpressure, and the water absorbent material and fertilizer are made by coating with degradable film.

The water/root regulating part 6 is made of degradable material and will be degraded by nature after a scheduled time, hereby the root system will further develop downward. The material of the water/root regulating part 6 may be degradable film material and the like, the initial water penetration pressure thereof is 0.0001 MPa, and the material degradation time is 60~120 days. The water capacity space 12 is molded by the water/root regulating part 6 through processes such as hot treatment, stretching, folding and composing, and their expandable height is 30~50 mm.

The seed mixture 8, 5~20 mm thick, 50 mm~100 mm wide and 50 mm~100 mm long, is arranged at a spacing of 200 mm~500 mm. The seed mixture 8 can be packaged with water soluble material and then be filled into the seed-stacking cavity of the water-temperature-light controlling part, and the seed germination belt 7 can also be directly filled into the seed-stacking cavity of the water-temperature-light controlling part after treated by the water-soluble coating process. The seed mixture is made by mixing the plant seeds, water retention material, adhesive material, organic matter and fertilizer, and the water soluble packaging material is made of water soluble material such as water soluble film, water soluble paper, water soluble non-woven fabrics and the like.

The seed-stacking cavity, sized to accommodate the seed mixture, is made by penetrating and opening holes on the water-temperature-light controlling part.

The size of the seed germination belt 7 is designed to just cover the seed mixture 8. Covering the seed mixture 8 with the seed germination belt 7 can reduce the water evaporation in the seed mixture, enhance the rate and speed of seeds germination, and reduce the cost of the engineering water conservation. The seed germination belt 7 can be directly made by opening holes on the irradiation reflecting part 1 of the water-temperature-light controlling part, or by opening holes on other material layers, and then combining the material layer and the water-temperature-light controlling part to be a whole through hot pressing or glue bonding. The effective time of the material function is more than 2 years.

The seed germination holes 11, in the form of slits, can cover the seed mixture completely when the seeds have not germinated and reduce the water evaporation, while seedlings would open the coverings and emerge after the seeds have germinated. The seed germination holes 11 are in a shrinkage closed state before the seed mixture absorbs water and will open under the water swelling stress after the seed mixture absorbs water; The seed germination holes 11 may be one or more of a cruciform slit, a ✻-shaped slit, a ⊏-shaped slit, a E-shaped slit, a T-shaped slit, a X-shaped slit, a V-shaped slit, a ∩-shaped slit, a circular hole and a square hole arranged at a certain spacing and in a certain manner. The size of the open holes is 5 mm~20 mm.

The first water infiltration holes 9 have a size of 10 mm$^2$~500 mm$^2$ and can be one of a square hole, a round hole, a triangular hole and a polygon hole arranged at a certain spacing.

The second water infiltration holes 10 have a size of 50 mm$^2$~500 mm$^2$ and can be one of a square hole, a round hole, a triangular hole and a polygon hole arranged at a certain spacing.

The advantages of the greening roll structure reside in:

1. The innovative use of the root growing part 5, which contains plant growth substrate made by overpressure compression and controllable water and nutrients releasing material made by coating with degradable film, has the functions of balancing the supply of water and nutrients efficiently and inducing the root system to be stable. This innovatively solves the key technology of the stable growing of plants in soilless interfaces, as well as reduces the cost of project construction.

2. The water-temperature-light controlling part reflects the irradiation and reduces the heat absorption, while the temperature regulation function structure and material reduces the heat conductivity and prevents the light, which realize the regulation and stability of the temperature and heat, reduce the water evaporation, promote the healthy growth of plants, protect plants from the photosynthetic induction under soilless conditions, promote the roots growth, and have the effect of thermal insulation and prevent the water evaporation.

3. Efficient collection of rainfall and artificially compensated water can be obtained by the first and second water infiltration holes 9 and 10. Water is made to enter into the internal of the water-temperature-light controlling part, and then transported into the root growing part 5 and the seed mixture 8 through the apertures inside the water-temperature-light controlling part. Consequently, a high utilization rate of water is achieved; moreover, the speed of the water flowing inside the water-temperature-light controlling part can be slowed down due to the barrier effect of the material, so the scour erosion to the seed mixture and root growing layer by water flow is reduced.

4. The structural design of the seed mixture 8 can enhance the seed germination rate and germination speed, increase the survival rate of seedlings and realize a uniform arrangement of seeds, thereby reducing the amount of seeds dosage. It achieves a rapid coverage of plants and controls the plant density to promote the equilibrium between the interspecific and intraspecific competitions of plants, which is helpful for the long-term stability of the greening roll structure as well as its function.

5. Covering the seed mixture 8 with the seed germination belt 7 can reduce the evaporation of water in the seed mixture, improve seed germination rate and speed and reduce the cost of water conservation of the project; Using the slits form, the seed germination holes will completely cover the seed mixture when the seeds have not germinated and reduce the evaporation of water, while seedlings would open the coverings and emerge after the seeds have germinated.

6. The utilization of the structure of the water/root regulating part 6 provides the water capacity space 12, ensures the full absorption of the root growing layer, enhances the water-absorbing ability of the root growing part, keeps the water of the root growing material, improves the stability of the root growing material and induces the rapid growth of the root.

7. The greening roll can be packaged after being compressed and thus can be transported efficiently, which facilitates the construction and carry, such that it is advantageous for business use.

The invention claimed is:

1. A greening roll comprising:
a water-temperature-light controlling part located at an upper portion of the greening roll,
a water and root regulating part located at a lower portion of the greening roll,
a root growing part located in a cavity formed between the water-temperature-light controlling part and the water and root regulating part, and
a seed-stacking part located in a seed-stacking cavity of the water-temperature-light controlling part;
wherein the water-temperature-light controlling part comprises an irradiation reflecting layer, a temperature-water regulating part, and a light-preventing layer, and wherein the temperature-water regulating part is sandwiched between the irradiation reflecting layer and the light-preventing layer with the light-preventing layer facing the water and root regulating part;
the irradiation reflecting layer is made of degradable light-reflecting film;
the temperature-water regulating part includes sealed chambers and is formed by stretching and foaming degradable film;
the light-preventing layer is made of opaque material.

2. The greening roll according to claim 1, wherein the water and root regulating part is made of overpressure permeable material or perforated material and has water capacity space arranged therein; the water capacity space is formed by folding the overpressure permeable material or the perforated material after stretching and may open under water swelling stress of the root growing part to form holding chambers, which accommodate root growing material and water.

3. The greening roll according to claim 1, wherein the root growing part is a root inducing mixture comprising plant growth substrate, water absorbent material and fertilizer, wherein the plant growth substrate is particles made by overpressure compression, which increases the amount of matter in the greening roll and ensures safe planting of plants in soilless conditions; the water absorbent material and fertilizer may achieve controlled release through coating with degradable film, so as to meet requirements of plant growth.

4. The greening roll according to claim 1, wherein the seed-stacking part comprises a seed mixture filling groove for receiving a seed mixture and a seed germination belt; the seed germination belt is located above the seed mixture filling groove and covers the seed mixture, wherein seed germination holes are arranged on the seed germination belt.

5. The greening roll according to claim 4, wherein the seed germination holes are in a shrinkage closed state before the seed mixture absorbs water, and open under water swelling stress after the seed mixture absorbs water; the seed germination holes are one or more of a cruciform slit, a E-shaped slit, a T-shaped slit, a X-shaped slit, a V-shaped slit, a circular hole and a square hole.

6. The greening roll according to claim 1, wherein first water infiltration holes are arranged in the irradiation reflecting layer, and second water infiltration holes are arranged in the light-preventing layer, the second water infiltration holes and the first water infiltration holes are in fluid communication through gaps between the sealed chambers in the temperature-water regulating part; the seed-stacking part is in fluid communication with the first water infiltration holes through the gaps between the sealed chambers in the temperature-water regulating part.

7. A greening roll comprising:
a layered water-temperature-light controlling structure having sealed chambers and seed-stacking cavities;
a water and root regulating layer facing the layered water-temperature-light controlling structure; and
root growing cavities formed by and between the layered water-temperature-light controlling structure and the water and root regulating layer,
wherein portions of the water and root regulating layer are in direct contain with the layered water-temperature-light controlling structure so as to separate the root growing cavities from each other.

8. The greening roll according to claim 7, wherein the layered water-temperature-light controlling structure comprises an irradiation reflecting layer, a light-preventing layer and a temperature-water regulating part sandwiched between the irradiation reflecting layer and the light-preventing layer with the light-preventing layer facing the water and root regulating layer, and wherein the sealed chambers are formed in the temperature-water regulating part.

9. The greening roll according to claim 8, wherein first water infiltration holes are arranged in the irradiation reflecting layer, and second water infiltration holes are arranged in the light-preventing layer, the second water infiltration holes and the first water infiltration holes are in fluid communication through gaps between the sealed chambers in the layered temperature-water regulating structure, the seed-stacking cavities are in fluid communication with the first water infiltration holes through the gaps between the sealed chambers in the layered temperature-water regulating structure.

10. The greening roll according to claim 7, wherein the water and root regulating layer is made of overpressure permeable material or perforated material and has water capacity space arranged therein, the water capacity space is formed by folding the overpressure permeable material or the perforated material and may open under water swelling stress to form holding chambers.

11. The greening roll according to claim 7, wherein a root inducing mixture is provided in the root growing cavities, the root inducing mixture comprises granular plant growth substrate, water absorbent material and fertilizer.

12. The greening roll according to claim 7, wherein a seed mixture is provided in the seed-stacking cavities, and a seed germination belt is provided above each of the seed-stacking cavities and covers the seed mixture, wherein seed germination holes are arranged on the seed germination belt.

13. The greening roll according to claim 12, wherein the seed germination holes are in a shrinkage closed state before the seed mixture absorbs water, and open under water swelling stress after the seed mixture absorbs water.

14. A greening roll comprising:
a water-temperature-light controlling part located at an upper portion of the greening roll,
a water and root regulating part located at a lower portion of the greening roll,
a root growing part located in a cavity formed between the water-temperature-light controlling part and the water and root regulating part, and
a seed-stacking part located in a seed-stacking cavity of the water-temperature-light controlling part;
wherein the water and root regulating part is made of overpressure permeable material or perforated material and has water capacity space arranged therein; the water capacity space is formed by folding the overpressure permeable material or the perforated material after stretching and may open under water swelling stress of the root growing part to form holding chambers, which accommodate root growing material and water.

15. The greening roll according to claim 14, wherein the root growing part is a root inducing mixture comprising plant growth substrate, water absorbent material and fertilizer, wherein the plant growth substrate is particles made by overpressure compression, which increases the amount of matter in the greening roll and ensures safe planting of plants in soilless conditions; the water absorbent material and fertilizer may achieve controlled release through coating with degradable film, so as to meet requirements of plant growth.

16. The greening roll according to claim 14, wherein the seed-stacking part comprises a seed mixture filling groove for receiving a seed mixture and a seed germination belt; the seed germination belt is located above the seed mixture filling groove and covers the seed mixture, wherein seed germination holes are arranged on the seed germination belt.

* * * * *